UNITED STATES PATENT OFFICE 2,221,807

TERTIARY ALKYL HALO-PHENOLS

Lindley E. Mills, Midland, Mich., assignor to The Dow Chemical Company, Midland, Mich., a corporation of Michigan No Drawing. Application October 29, 1934,
Serial No. 750,598

3 Claims. (Cl. 260—623)

The present invention regards a new class of compounds, namely, the mono- and di-halogenated tertiary alkyl phenols.

I have prepared compounds of the aforementioned class, determined certain physical properties thereof whereby they may be readily identified, and found that they may advantageously be used for various purposes, for example, as antiseptics, germicides, etc. The invention, then, consists of the new products hereinafter fully described and particularly pointed out in the claims.

The compounds included within the scope of my invention have the following general structural formula, wherein one X represents a halogen, e. g. chlorine or bromine, the other X represents either hydrogen or a halogen, and Y represents a tertiary alkyl group:

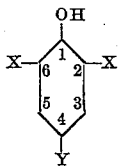

The preparation of my new compounds can be accomplished by treating a 4-tertiary alkyl phenol directly with a halogen. For example, a such phenol is placed in a closed reactor preferably provided with an agitator, a halogen inlet, and an outlet suitable for the removal of the hydrogen halide gas formed during the course of the reaction. The phenol is heated above the melting point, if the material is normally a solid, and the halogen then introduced below the surface of the liquid. A solvent for the phenol, which is not halogenated under the conditions of the reaction, may be used if desired. Among the solvents I have found suitable for use is carbon tetrachloride. After the desired amount of halogen has been introduced into the reactor, the reaction product is blown with air to insure removal of any small amounts of hydrogen halide remaining therein. The product, i. e. the 1-hydroxy-2-halo- or 1-hydroxy-2.6-halo-4-tertiary alkyl benzene, can then be separated from the reaction product by fractional distillation, preferably in vacuo.

The following examples describe in detail the preparation of certain specific members of my new class of compounds.

EXAMPLE 1.—*2-chloro-4-tertiary butyl phenol*

In a reactor provided with an agitator was placed 100 grams (0.667 mol) of 4-tertiary butyl phenol. The phenol was heated to and maintained at a temperature of about 65° to 85° C. and chlorine was introduced slowly below the surface of the liquid compound. When 0.516 mol of hydrogen chloride had been evolved from the reaction mixture, the passage of chlorine thereinto was stopped, and the product was blown with air to remove a slight amount of hydrogen chloride remaining therein. The product was then fractionated in vacuo and 103.5 grams of 2-chloro-4-tertiary butyl phenol was obtained. This corresponds to a yield of 84 per cent of theoretical. The compound is a liquid having a specific gravity of 1.099 at 25° C./25° C., boiling at 84.5°–86° C. at 3–4 millimeters of mercury absolute pressure. The phenol coefficient of the compound against *E. typhi* is 13.0.

EXAMPLE 2.—*2-bromo-4-tertiary amyl phenol*

In the same apparatus as used in the above experiment, was placed 200 grams (1.22 mol) of 4-tertiary amyl phenol which was heated to and maintained at a temperature of about 90°–95° C. 195.2 grams (1.22 mol) of liquid bromine was introduced slowly below the surface of the heated phenol. After all of the bromine had been introduced, the reaction product was blown with air, and then fractionally distilled in vacuo. In this manner 221.0 grams of 2-bromo-4-tertiary amyl phenol was obtained, corresponding to 74.5 per cent of theoretical yield. Upon analysis, the theoretical percentage of halogen, i. e. 32.9 per cent by weight, was found in the compound. The compound is a liquid having a specific gravity of 1.308 at 25° C./25° C., boiling at 119° to 120° C. at 6–7 millimeters of mercury pressure absolute. The phenol coefficient of this compound is 8.0 against *E. typhi*.

EXAMPLE 3.—*2-chloro-4-tertiary octyl phenol*

I have treated 200 grams (0.97 mol) of 4-tertiary octyl phenol with chlorine at a temperature of 60°–110° C. until 0.97 mol of hydrogen chloride was evolved. The reaction product was then fractionally distilled and 181.5 grams of 2-chloro-4-tertiary octyl phenyl, a 78 per cent of theoretical yield, was recovered. The boiling point of the compound is 145° to 150° C. at 5–6 millimeters of mercury pressure absolute. The specific gravity at 25° C./25° C. is 1.055. Analysis of the compound for chlorine gave 15.01 per cent of halogen which is very close to the theoretical percentage of 15.00. The phenol coefficient of the compound against *E. typhi* is 8.0 compared to phenol with a value of 1.0.

EXAMPLE 4.—*2.6-dibromo-4-tertiary butyl phenol*

I employed 135 grams (0.9 mol) of 4-tertiary butyl phenol, maintained at a temperature of about 100° C., and added thereto 288 grams (1.8 mol) of bromine. The yield of product obtained by fractional distillation was 244.5 grams corresponding to an 88.3 per cent of theoretical yield. The boiling point of the compound is 148° C. at 7–8 millimeters of mercury absolute, and the melting point of the material is 71° C. Analysis for bromine showed an actual percentage thereof of 51.53 as against a theoretical percentage of 51.94. The phenol coefficient of the compound against *E. typhi* is 3.0.

EXAMPLE 5.—*2.6-dichloro-4-tertiary amyl phenol*

I treated 200 grams (1.22 mol) of 4-tertiary amyl phenol, maintained at a temperature of 85° to 95° C., with chlorine until 2.41 mols of hydrogen chloride had been evolved. The yield of 2.6-dichloro-4-tertiary amyl phenol recovered from the reaction product was 269.1 grams corresponding to 94.9 per cent of theoretical. The boiling point of the compound is 120° to 125° C. at 6 millimeters of mercury pressure absolute and the melting point of the compound is 58° C. The percentage of halogen found in my compound by analysis was 29.78 per cent as compared with a theoretical percentage of 30.00.

EXAMPLE 6.—*2.6-dibromo-4-tertiary octyl phenol*

In the preparation of this compound I treated 348 grams (1.22 mol) of 2-bromo-4-tertiary octyl phenol, at a temperature of 80°–100° C., with 195 grams (1.22 mol) of bromine. The yield of dibromo- compound was 324.5 grams or 73 per cent of theoretical. The boiling point of this compound is 158° to 163° C. at 3–6 millimeters of mercury pressure absolute. The specific gravity of the material is 1.455 at 25° C./25° C. Analysis for percentage of bromine showed 44.29 per cent present as compared with a theoretical percentage of 44.00. The phenol coefficient of the compound is 8.0 against *E. typhi*.

The phenol coefficients of my new compounds were determined by the method developed by the United States Public Health Service, Hygienic Laboratory, Circular No. 198 of the Food and Drug Administration, United States Department of Agriculture and are based upon a coefficient of 1.0 for pure phenol.

Other modes of applying the principle of my invention may be employed instead of the one explained, change being made as regards the materials employed, provided the products claimed in the following claims be thereby obtained.

I therefore particularly point out and distinctly claim as my invention:

1. A tertiary amyl halo-phenol having the following structural formula

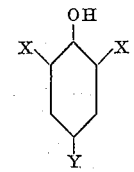

wherein one X represents a halogen, the other X represents a member selected from the group consisting of hydrogen and the same halogen, and Y represents the tertiary amyl group.

2. 4-tertiary amyl-2-bromophenol.

3. A tertiary amyl chlorophenol having the following structural formula

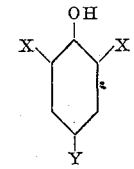

wherein one X represents chlorine, the other X represents a member selected from the group consisting of hydrogen and chlorine, and Y represents the tertiary amyl group.

LINDLEY E. MILLS.